W. S. WADSWORTH.
Plow.
No. 166,734.
Patented Aug. 17, 1875.
Fig: 1.
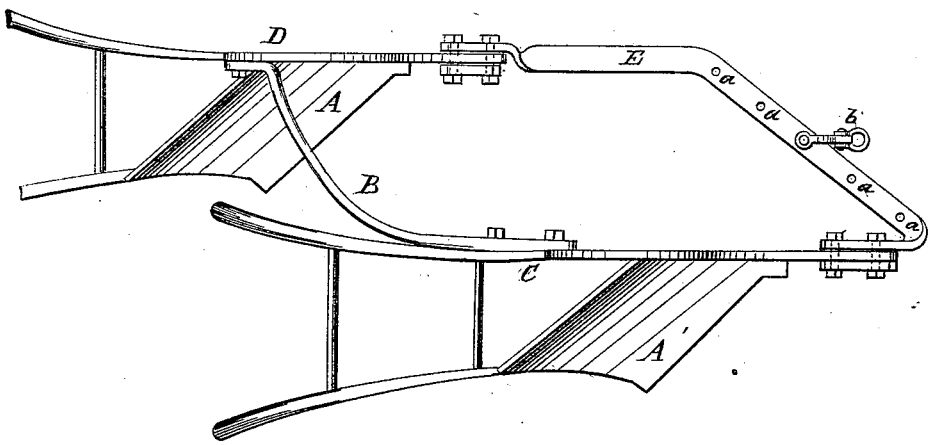
Fig: 2.
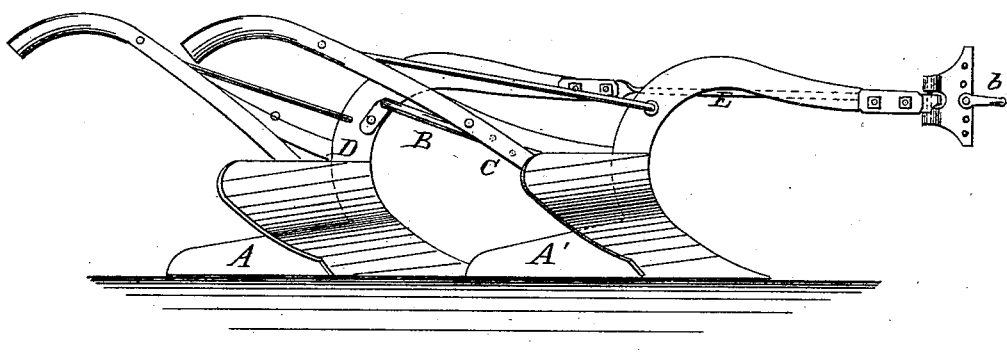
Witnesses:
Inventor:
Wilson S. Wadsworth

UNITED STATES PATENT OFFICE.

WILSON S. WADSWORTH, OF MIAMI COUNTY, KANSAS.

IMPROVEMENT IN PLOWS.

Specification forming part of Letters Patent No. 166,734, dated August 17, 1875; application filed May 24, 1875.

*To all whom it may concern:*

Be it known that I, WILSON S. WADSWORTH, of the county of Miami and State of Kansas, have invented a new and useful Improvement in Plows; and that the following is a full, clear, and exact description of the same, reference being had to the accompanying drawings and to the letters of reference marked thereon, making a part of this specification.

This invention is in the nature of an improvement in plows; and the invention consists in connecting together two plows of ordinary construction, in the manner hereinafter described, forming a gang-plow.

In the accompanying sheet of drawings, Figure 1 is a plan or top view of my invention, and Fig. 2 a side view of same.

Similar letters of reference indicate like parts in both figures.

A A' represent two plows of ordinary construction. One of these plows is placed on one side and slightly in the rear of the other, as shown in Fig. 1, in which position they are retained by a strap, B, which is bolted to the side of one of the handles, C, of one plow, and to the side of the beam D of the other plow, and to the ends of the beams of each of the plows is likewise bolted a strap, E, this strap being of the shape shown in Fig. 1, and having formed in it a series of holes, a, to which is affixed the clevis b and evener.

When the straps are in place the two plows are held in a position rendering them serviceable as gang-plows; and they may be placed in this position very quickly by simply forming one bolt-hole in the beam of one plow and two bolt-holes in the side of the handle of the other, through which suitable bolts are passed, holding the strap in place; and the bar E, that is secured to the front end of the plow-beams, is there held by bolts which pass through the ordinary holes, by which the clevis is fastened, so that by simply removing the clevises the front strap E is held in place, and the strap itself then becomes a support for the clevis giving really a larger range for the angle of draft than would otherwise be obtained by the ordinary attachment of the clevis to the beam.

If it is desired to use the gang-plows for left-hand plowing, this may be done by substituting left-hand plows for right-hand plows, and changing the position of the straps, the front strap E being turned upside down, which will bring it in proper position for coupling the plows for left-hand plowing. At other times, or when it is not desired to use the plows as gang-plows, the bars or straps may be detached altogether, and the plows used singly in the ordinary way.

If it is desired to use the plows for plowing sod the ordinary gage-wheels may be attached to each beam of the plow in the ordinary manner.

As before stated, the clevis b is attached to the strap E, and this strap having holes in it, it may be attached so as to bring the draft at any angle desired, so that this clevis becomes, in fact, a regulating-clevis, or rather an adjustable clevis, by being shifted at different angles.

I am well aware that it is not original with me to connect two ordinary plows, so as to form a gang-plow, and I hereby disclaim such invention.

Having thus described my invention, what I claim as new, and desire to secure by Letters Patent, is—

In a gang-plow composed of two ordinary plows, the brace B, attached to the handle of one plow and to the beam of the other, in combination with the angular brace E, having the adjustable clevis b, substantially as shown and described.

WILSON S. WADSWORTH.

Witnesses:
WILLIAM H. COLLINS,
M. A. FIELD.